US010573347B2

(12) United States Patent
Benson (10) Patent No.: US 10,573,347 B2
(45) Date of Patent: *Feb. 25, 2020

(54) SYSTEM FOR AUTOMATED TELEVISION PRODUCTION (71) Applicant: GVBB HOLDINGS S.A.R.L., Luxembourg (LU)

(72) Inventor: John R. Benson, Jacksonville, FL (US)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,866

(22) Filed: Oct. 17, 2017

(65) Prior Publication Data

US 2018/0047426 A1 Feb. 15, 2018

Related U.S. Application Data (63) Continuation of application No. 12/736,386, filed as application No. PCT/US2008/013969 on Dec. 22, 2008, now Pat. No. 9,812,170.

(Continued)

(51) Int. Cl.
*G11B 27/034* (2006.01)
*G11B 27/34* (2006.01)
(Continued)

(52) U.S. Cl.
CPC ............ *G11B 27/034* (2013.01); *G11B 27/34* (2013.01); *H04H 60/07* (2013.01); *H04N 5/222* (2013.01)

(58) Field of Classification Search
CPC ............................. G11B 27/034; G11B 27/34
See application file for complete search history.

(56) References Cited

U.S. PATENT DOCUMENTS 5,359,712 A 10/1994 Cohen et al.
7,024,677 B1 4/2006 Snyder et al.
(Continued)

FOREIGN PATENT DOCUMENTS

JP H08328644 A 12/1996
JP H09044524 A 2/1997
(Continued)

OTHER PUBLICATIONS

Holts: "Grass Valley Ignite Multicast Market Opportunity Technology and System for Live Production & Business Case White Paper," Sep. 18, 2006, Grass Valley, Thompson Grass Valley Integrated Production Solutions, pp. 1-34.

(Continued)

*Primary Examiner* — Chris Parry
*Assistant Examiner* — Steven C Nguyen
(74) *Attorney, Agent, or Firm* — Arent Fox LLP (57) ABSTRACT A media production system for automatically controlling device parameters during a media production. In an exemplary aspect, the system includes a rundown markup interface generator that generates a rundown markup interface by populating one or more of an event timeline and a playlist during creation of a media production and that includes a macro event generated from a macro event template. The system further includes an automated media production system that on the fly prevents conflicts between device parameters of media production devices by automatically modifying a first variable in the macro template that is associated with a first device parameter of the device parameters in response to a change of one or more second variables that are associated with a second device parameter.

35 Claims, 8 Drawing Sheets

Related U.S. Application Data (60) Provisional application No. 61/123,914, filed on Apr. 11, 2008.

(51) Int. Cl.
*H04H 60/07* (2008.01)
*H04N 5/222* (2006.01)

(56) References Cited

U.S. PATENT DOCUMENTS

| | | | | |
|---|---|---|---|---|
| 7,146,615 | B1* | 12/2006 | Hervet | G06F 8/34 |
| | | | | 719/318 |
| 7,302,644 | B2 | 11/2007 | Holtz et al. | |
| 2002/0026514 | A1 | 2/2002 | Ellis et al. | |
| 2002/0109710 | A1 | 8/2002 | Holtz et al. | |
| 2004/0008220 | A1* | 1/2004 | Snyder | G06F 3/0481 |
| | | | | 715/716 |
| 2004/0210945 | A1* | 10/2004 | Snyder | G06F 3/0481 |
| | | | | 725/135 |
| 2005/0223106 | A1 | 10/2005 | Ross et al. | |
| 2005/0226596 | A1 | 10/2005 | Moriya et al. | |

FOREIGN PATENT DOCUMENTS

| | | | |
|---|---|---|---|
| JP | H11145919 | A | 5/1999 |
| JP | 2003517786 | A | 5/2003 |
| JP | 2004320435 | A | 11/2004 |
| JP | 2005318550 | A | 11/2005 |
| JP | 2007518288 | A | 7/2007 |
| WO | 2004107228 | A2 | 12/2004 |
| WO | 2005074255 | A1 | 8/2005 |

OTHER PUBLICATIONS

Broadcast Engineering: "New Thompson Ignite IQ Option Enhances Automation Capabilities," Thompson Grass Valley, Mar. 20, 2008.
Japanese Office Action of Application No. 2011-503952, dispatched Jul. 31, 2013.
International Preliminary Report on Patentability dated Oct. 12, 2010 and Written Opinion regarding PCT/US2008/013969.
PCT Publication No. WO2009/126129A1 dated Oct. 15, 2009 including International Search Report dated May 29, 2009 regarding PCT/US2008/013969.
Notification of Reasons for Refusal dated Mar. 12, 2013 regarding Japan Patent Application No. 2011-503952.
Final Rejection dated Mar. 25, 2014 regarding Japan Patent Application No. 2011-503952.
EP Communication dated Jun. 15, 2011 regarding EP Application No. EP08873829.9.
First Office Action dated Apr. 19, 2012 regarding China Patent Application No. 20088012895.1.
Pre-Appeal Report dated Oct. 15, 2014, regarding JPA 2011-503952.
"Ignite News Workflow Application Note," [online], Apr. 2007 [Jul. 31 H25 search], internet URL:http://www.grassvalley.com/docs/Application_Notes/newsprod/ignite/IPS-1038M.pdf.
Second Office Action dated Dec. 17, 2012, regarding China Application No. CN200880128595.1, and English translation.
EP Office Action dated Jul. 2, 2015, regarding EP Application No. EP08873829.9.
Canadian Office Action dated Mar. 11, 2016 from corresponding Application No. CA 2,720,256.
Office Action and Examination Search Report regarding Canadian Patent Application No. 2,720,256 dated Jul. 10, 2019.

* cited by examiner

Ignite IQ Rundown Markup

File ▷ Custom Selctor ▷ Select Master ▷

Show: REAL WORLD SEM ▷  [Update] [Update All]

| Pages | Story | Segment | Anchor | Clip | Tape | SS | TME | Update |
|---|---|---|---|---|---|---|---|---|
| A1 | SHOW OPEN | - | GARY GNU | | TYPE | | SHO LP | ☐ |
| A2 | HEADLINES | INTRO | GARY GNU, GARY | | | | CAMM1CIP15CK4 LP | ☐ |
| A3 | HEADLINES | VO | GARY | | HOVO | | SWRM: LP | ☐ |
| A4 | DEER ATTACK | INTRO | GARY | | | | CAMM1CIP15CK4 LP | ☐ |
| A5 | DEER ATTACK | LIVE-TAG | GARY | | | | CAMC2M292 LP | ☐ |
| A6 | DEER ATTACK | LIVE | TRISHA, TRISHA | | | | BGX LP | ☐ |
| A7 | HIGHWAY ACCIDENT | READER | GARY GNU, GARY | | | | CAMm1: LP | ☐ |
| A8 | POLITICIAN SHOTS FIRED | INTRO | GARY GNU, GARY | | | | CAM LP | ☐ |
| A9 | POLITICIAN SHOTS FIRED | PACKAGE | JOHN | | | | SOT LP | ☐ |
| A10 | POLITICIAN SHOTS FIRED | TAG | GARY | | | | CAMP3ECK4 LP | ☐ |
| A11 | BUS TRIP | LIVE | HEYWOOD | | | | REM LP | ☐ |
| A12 | BUS TRIP | INTRO | GARY GNU, GARY | | | | CAMC2P2M2 LP | ☐ |
| A13 | BUS TRIP | LIVE TAG | GARY GNU, GARY | | | | CAMC2P2M2 LP | ☐ |
| A14 | FIRST LOOK WEATHER | WX WALL | ROSEVELTE E. ROSEVEL | | | | CAM | ☐ |
| A15 | FIRST LOOK WEATHER | DECK | ROSEVELTE, GARY ROSEV | | | | DBX LP | ☐ |
| A16 | TEASE | VO | GARY GNU, GARY | | | | CAM LP | ☐ |
| A17 | TEASE | W-VO | GARY | | | | SWRM: LP | ☐ |
| B0 | BREAK 1 | - | - | | | | | ☐ |
| B1 | TOP STORIES | HEAD | GARY GNU, GARY | | | | | ☐ |
| B2 | TOP STORIES | WOMAN | GARY GNU, GARY | | | | | ☐ |

FIG. 8

SYSTEM FOR AUTOMATED TELEVISION PRODUCTION

CROSS-REFERENCE TO RELATED APPLICATIONS

This application is a continuation of U.S. patent application Ser. No. 12/736,386, filed Oct. 2, 2010, which is a National Stage Application and claims the benefit under 35 U.S.C. § 365 to International Application No. PCT/US2008/013969, filed Dec. 22, 2008, which in turn claims priority under 35 U.S.C. § 119(e) to U.S. Provisional Patent Application Ser. No. 61/123,914, filed Apr. 11, 2008, the entire contents of each of which are incorporated herein in their entirety.

TECHNICAL FIELD

The present principles relates to television production. More particularly, it relates to automated television production, for example, news automation.

BACKGROUND ART

In television production, and more particularly news automation, the number of combinations of video, audio, digital video effects generators and other devices needed to create the unique events required to create a TV news program can easily number in the thousands. Managing the events created by the combination of devices can prove cumbersome and time consuming. Thus, an operator's decision to modify a particular event typically will require modification of all the individual variations of that event as well which could easily number in the hundreds. It is therefore apparent that many errors can occur in the hundreds of variations.

Some have attempted to solve this issue by breaking up the events into smaller discrete events that handle a single action, i.e. controlling audio fades, video switching, etc. The theory being that modifying one of these discrete events is easier than modifying a more complex event that consists of different actions. The drawback to this approach is that one must take these discrete events and put them together each time they need to be used. In other words, one would have to build each event every time they needed to use it. This significantly increases the time required to build a news program to the point where it cannot be considered a viable solution to the problem.

Other approaches proposed include the "Builder Utilities" that can, based on parameters, automatically generate all the combinations for that particular event. Using this approach will generate combinations that will never be used or do not make logical sense. This approach also requires that the user re-run this utility whenever a change occurs to a base event that served as the foundation for the various combinations arising from that event. Overall, this approach has proven cumbersome and wasteful.

SUMMARY OF THE INVENTION

According to an implementation of the present principles, a method for updating a control event for controlling at least one device to produce audio visual content includes the steps of analyzing the control event to establish: (1) parameter(s) corresponding to the control event available for modification; and (2) parameter(s) of other control events influenced upon modification of at least one parameter corresponding to the control event, and modifying the parameter of the control event and other control events influenced thereby in response to user input changing at least one parameter of the control event available information.

The method can include the creation of a template to operate as one or more control events for the production. The creation of a template can include assigning a data field within a property page of the template as fixed or variable, storing source information for the data field with the template when the data field is fixed; and saving the template by assigning a bitmap to visually represent an effect of the template.

The creation of the template can include assigning a data field within a property page of the template as fixed or variable, providing identification (ID) for the data field for data entry into a production system, assigning a source for the data field, and linking one or more fields within the template. According to one implementation, multiple property assignments are grouped under a single variable entry. A key variable can be assigned to one variable or a variable group. A determination is then made as to whether variables are needed for data external to the template. Property page fields that have been linked and templates that have variables are displayed. A list of pop-up variables for that template undergoes display. The template is saved by assigning a bitmap to visually represent an effect of the template. The linking can include linking control room data (e.g., Newsroom Computer System (NRCS) data) and production system data with the template.

In accordance with another implementation, the linking further comprises automatically linking media ID and production event data (i.e., this data is separate data in the NRCS.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

As described in greater detail below, the present principles provides a technique for updating control events during automated television production, and thus has great value in connection with automated television production systems, especially those that make use of the Transition Macro Event (TME) concept used in the IGNITE® automated television production system manufactured by Thomson Grass Valley, Inc., Jacksonville, Fla. Those of skill in the art will recognize that the IGNITE® system is only one example of an automated television production system used in news automation environments, and that the principles of the present principles readily apply to other production systems without departing from the scope of this disclosure.

The present principles provides another layer (hereinafter referred to as the IQ layer) to production systems, such as, for example, the IGNITE® System, for enabling updating of parameters during automated television production such that modification of one parameter will automatically update other parameters linked to the modified parameters. The term "IQ" serves to differentiate a standard TME with fixed data from a Production Event (IQT) that has expanded variable data that manually or automatically changed during use. This IQ layer allows the creation of a new type of TME (referred to herein as the "IQ Template") which provides flexibility to adapt future changes in production system (e.g., newsroom) equipment and talent.

A Transition Macro Event (TME) constitutes logical grouping of device events that are arranged on a timeline that, such that upon execution of the event, commands get sent by the automated production system to various devices to produce the desired television production event. Each device event has properties that determine the behavior of the equipment performing one or more processes associated with the desired event. For a more detailed explanation of an automated production system, and the manner in which a TME controls various devices, refer to U.S. Pat. No. 7,302,644 incorporated by reference herein.

Figure 1:
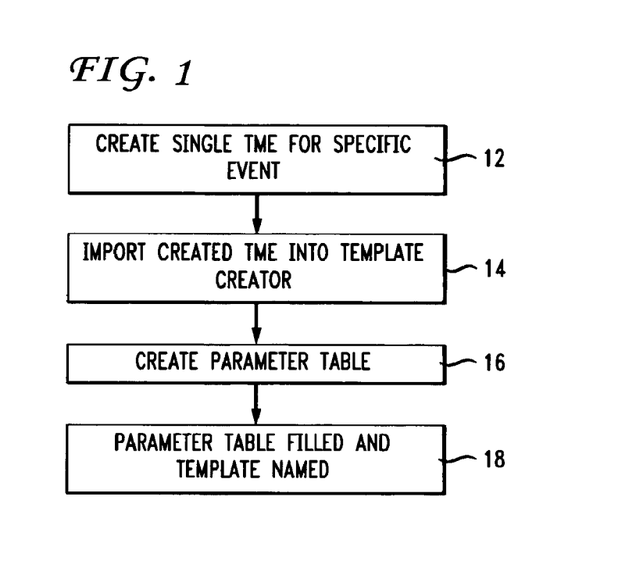
FIG. 1 depicts a flow diagram illustrating the steps of a method in accordance with a for updating a control event by creating a transition macro event (TME) template according to an implementation of the present principles.

FIG. 1 depicts a process 10 for creating a template according to an implementation of the present principles. The IQ template referred to herein can be considered to be one or more control events that are used during the production. Generally speaking, to create a template, the user creates a Single TME for a specific event (12). The user imports (14) that TME into the Template Creator application of the respective production system, which analyzes the original TME and makes all the variables available for insertion into a parameter table. The user then creates (16) the parameter table by creating a user variable and selecting the parameters controlled by that variable. The user then fills (18) the parameter table and names the template. During the fill stage (18), the user can also create additional tables.

Figure 2:
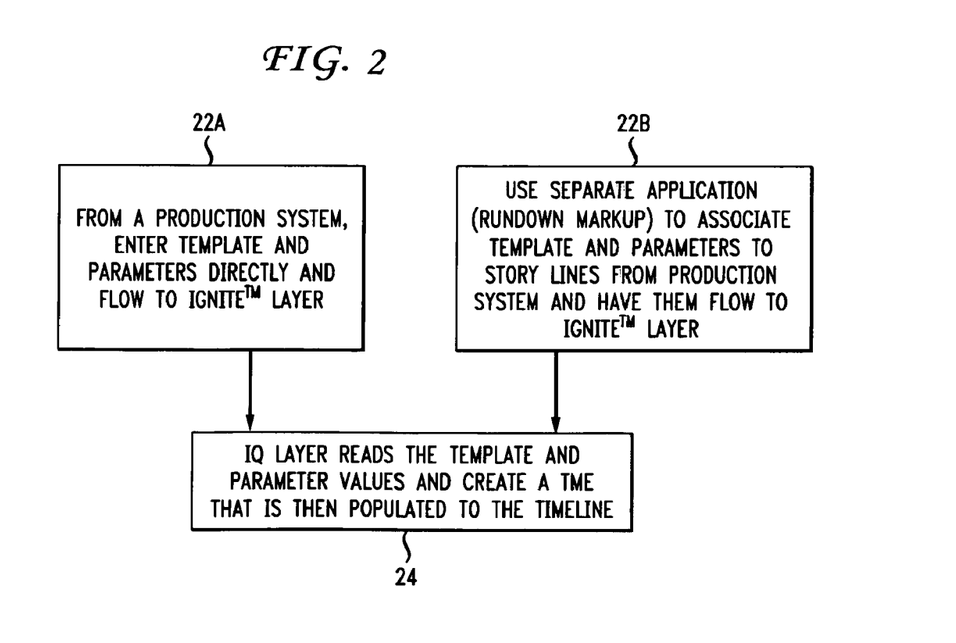
FIG. 2 depicts a flow chart diagram illustrating the steps of a process of using the template of FIG. 1 according to an implementation of the present principles.

FIG. 2 describes a process 20 for the template created in FIG. From the television production System (e.g., News Room Computer System), the producer or director can enter (22a) the template and parameters directly and have them flow to the IQ Layer of the present principles. Alternatively, the director can use a separate application (22b) called the "Rundown markup" to associate templates and parameters to story lines from the production system and have them flow to the IQ Layer of the present principles. Once sent, the IQ Layer reads (24) the template and parameter values and then creates a TME later then populated to the timeline.

Figure 3:
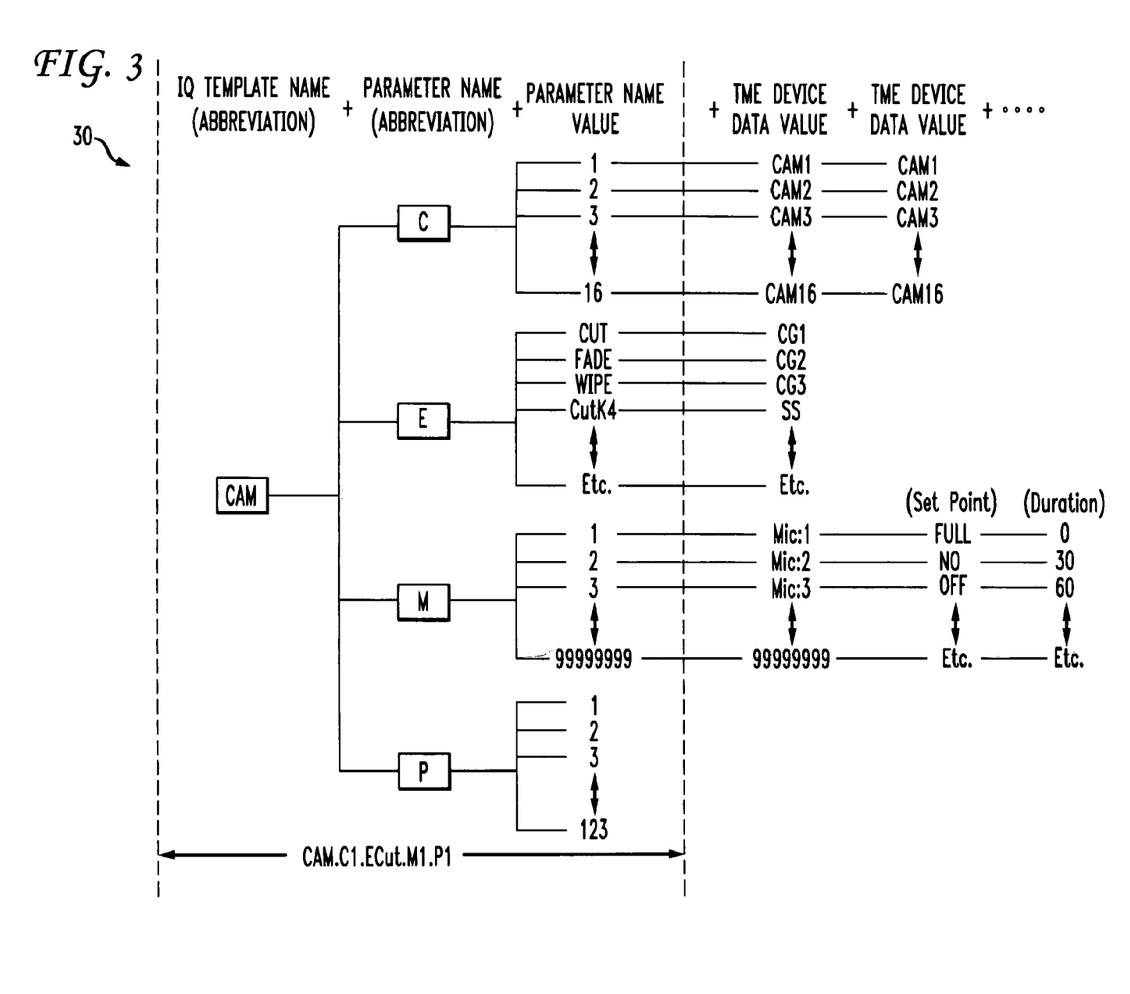
FIG. 3 illustrates an exemplary camera template according to an implementation of the present principles.

FIG. 3 depicts an example of a Camera Template 30 showing the association between the IQ template name, "CAM", and all components that comprise this template, according to an implementation of the present principles. By way of example, the sequence of components to enter for a TME in either a Newsroom Computer System or the Rundown Markup dialog box is:

IQ Template Name.ParameterNameParameterName-Value.

ParameterNameParameterNameValue.ParameterName-ParameterNameValue . . .

where a period separates the IQ Template name from each parameter name and parameter value group.

Each TME can have multiple parameter names and parameter name value groups, and each group can be entered in any order. At the bottom of the exemplary TME shown in FIG. 3 "CAM.C1.ECut.M1.P1", means that the CAM template contains this specific TME which, when imported into the rundown, performs the following tasks:

Uses Camera 1 or C1 (C1); contains an Effect that is a Cut (Cut);

Uses Microphone 1 (M1); and

Uses Preset 1 (P1).

Figure 4:
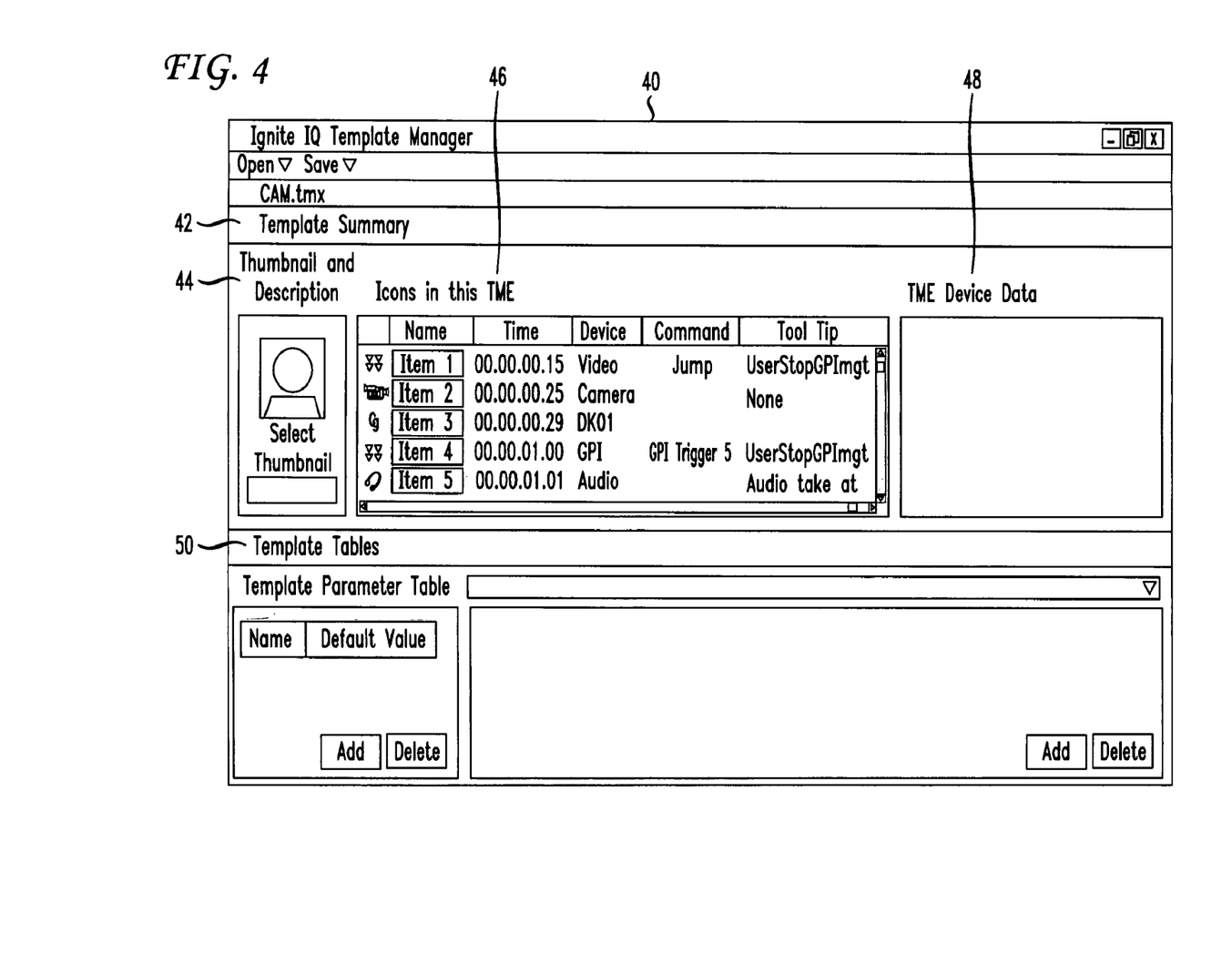
FIG. 4 depicts is an exemplary graphical user interface for a template manager according to an implementation of the present principles.

FIG. 4 shows an example of the Template Manager 40 according to an implementation of the present principles. The Template Manager 40 constitutes the interface used to manage TME and IQ Template information according to the present principles. From top to bottom, the template manager 40 includes a Template Summary area 42 which contains descriptive information about the template, a list of the devices used in the TME, and a list of the device data associated with each device in the TME. Within the Template Summary area 42, there resides a thumbnail and description field 44 which is an area that allows a user to assign a thumbnail graphic and description to a template. The Icons within this TME area 46 contain information displayed about each device item in the TME (e.g., parameters). The TME Device Data area 48 provides information relating to selections made in the Icons in this TME area 46. Thus, when a TME element is selected under the Icons for this TME (46), then the corresponding data device data for that TME appears under the TME Device Data area 48. The bottom part of the template 40 comprises the Template Table area 50.

Figure 5:
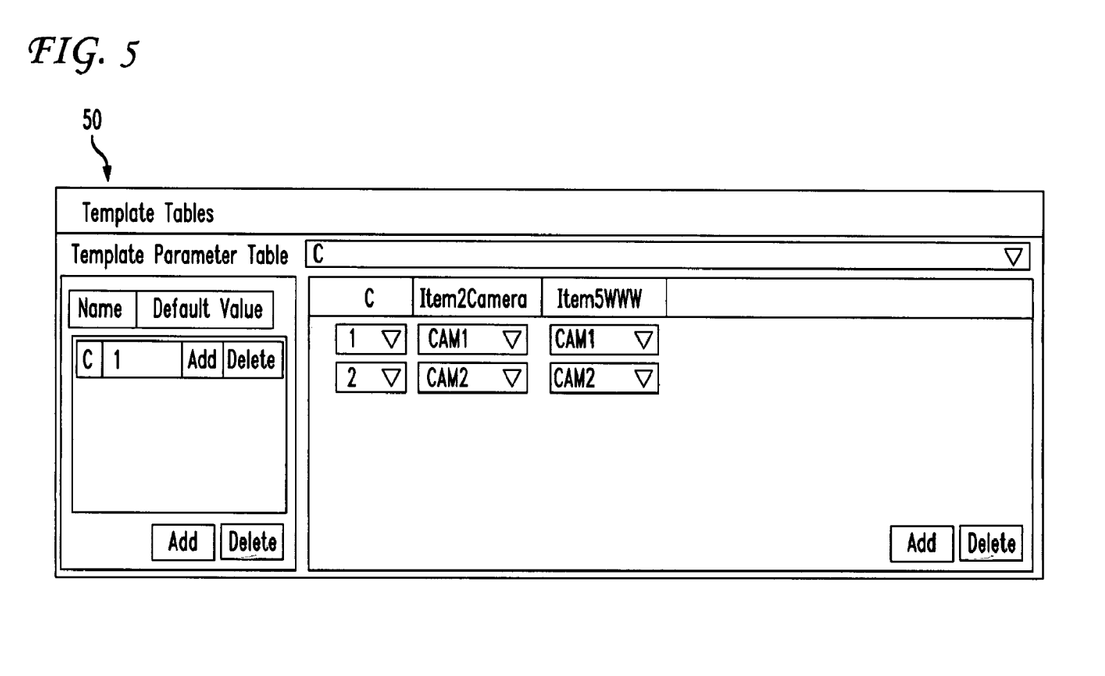
FIG. 5 depicts an enlarged view of a portion of a template table area of template manager shown in FIG. 4, according to an implementation of the present principles.

FIG. 5 shows a closer view of the Template Table area 50 according to an exemplary implementation of the present principles. The Template Table area 50 allows a user to create, edit and maintain parameter tables. As shown, the Template Table area 50 includes "parameter" related fields, such as, for example, Parameter Names, Parameter Name Values, TME Device Data Items, TME Device Data Values, Parameter Name List, Add/Delete Parameter Names, Add/Delete Parameter Name Values.

Figure 6:
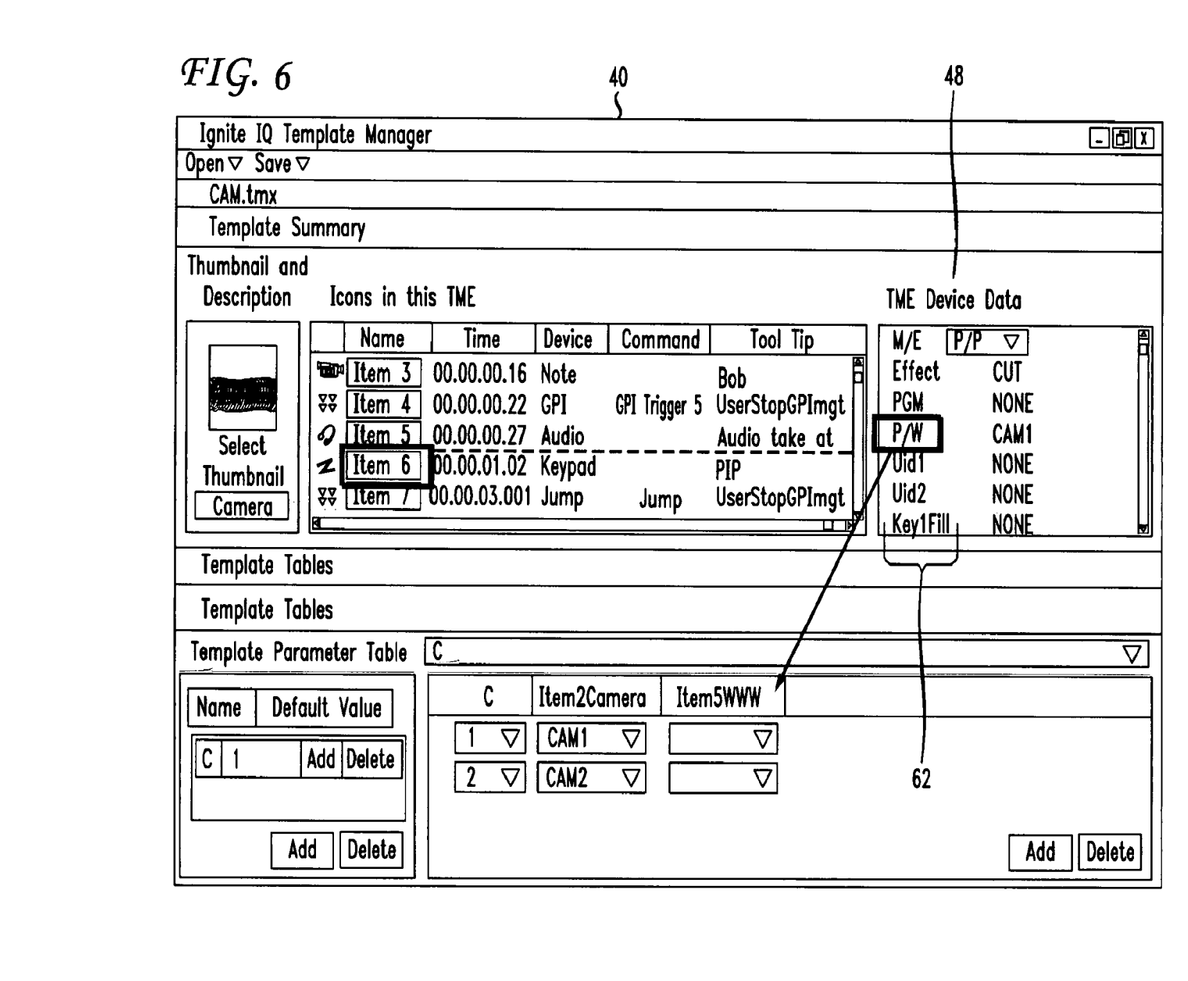
FIG. 6 depicts an alternative exemplary view of the graphical user interface for the template manager, according to an implementation of the present principles.

FIG. 6 depicts another example of the Template Manager 40 showing how the Preview Source value for the a video switcher, such as the Kayak® Video Switcher, from Thomson Grass Valley, has been added as a column 62 to the TME Device Data area 48. Now the user can change the video source based on parameters passed into the template. The video switcher properties refer to the list of properties that can be changed in the "IQT Template Manager/TME Device Data" for a switcher Control Object in a TME for control of the Video Switcher. The following comprises an exemplary list of properties the can be changed:

1. M/E (Assigns which Mix Effect Bank is controlling on the video Switcher);
2. Effect (Assigns the Ignite Effect, which determines the effect data sent to the video switcher);
3. PGM (Assigns the video source for the Program Bus of the Video Switcher);
4. PVW (Assigns the video source for the Preview Bus of the Video Switcher);
5. Util1 (Assigns the video source for the Utility 1 Bus of the Video Switcher);
6. Util2 (Assigns the video source for the Utility 2 Bus of the Video Switcher);
7. Key1Fill (Assigns the video source for the Key1 Fill Bus of the Video Switcher);
8. Key2Fill (Assigns the video source for the Key2 Fill Bus of the Video Switcher);
9. Key3Fill (Assigns the video source for the Key3 Fill Bus of the Video Switcher);
10. Key4Fill (Assigns the video source for the Key4 Fill Bus of the Video Switcher);
11. Key1Key (Assigns the video source for the Key1 Key Bus of the Video Switcher);
12. Key2Key (Assigns the video source for the Key2 Key Bus of the Video Switcher);
13. Key3Key (Assigns the video source for the Key3 Key Bus of the Video Switcher); and
14. Key4Key (Assigns the video source for the Key4 Key Bus of the Video Switcher).

The top center window shows "Icons in this TME" 46, which shows the device type included in the TME/IQT. When a user selects one of the "Icons" or device in the list (e.g., by left mouse click), the "TME Device Data" window is populate with editable properties for the selected device. The user can drag & drop any of the properties of the selected device into the "Template Parameterized Table" 52 to be associated with the selected variable. The arrow show the PVW (i.e., preview) Bus property of the Video Switcher has been added to Variable "C" of the Template table, by dragging the property into the Template table.

Figure 7:
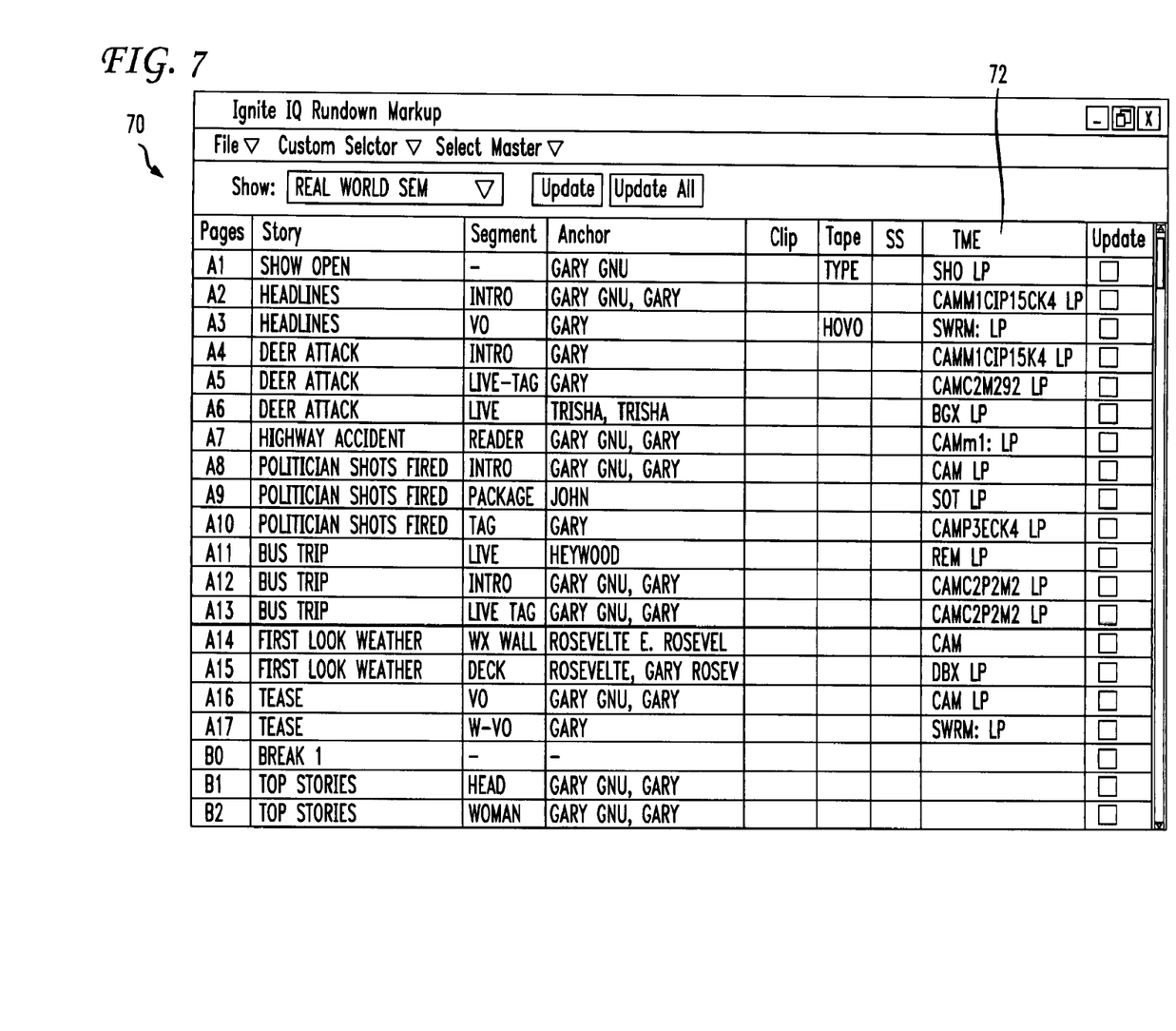
FIG. 7 depicts exemplary of a production system rundown markup interface according to an implementation of the present principles.

FIG. 7 shows an example of the IQ Rundown Markup 70 interface according to an implementation of the present principles. The IQ Rundown Markup interface provides an improved method of marking up rundown information in a show. The IQ Rundown Markup application improves the way TME/IQT data is entered into the automated television production system to populate the Event Timeline with production commands from the NRCS because it is linked to both the NRCS data and IQ data. Without IQ Rundown Markup, users enter text data for the TME/IQT name in a designated TME column within the NRCS but they must rely on memory for the correct name and configurable parameters for the IQT. The IQ Rundown Markup can be configured to displays any column data from the NRCS (For example Story running order, Page Number, Page Slug, Segment, Anchor, Clip, Tape, SS). It automatically updates for changes made in the NRCS, and displays which Story/Page has changed. The user has access to drop down list to change the values of Template Parameters and does not have to rely on memory.

The IQ Rundown Markup dialog box is an interface that obtains the rundown information directly from the NRCS and displays this information in the dialog box. When this application is used, as opposed to entering data directly through the NRCS, the user can access the TME Details screen 72 which allows the user to search through the templates and see the parameters and values.

Figure 8:
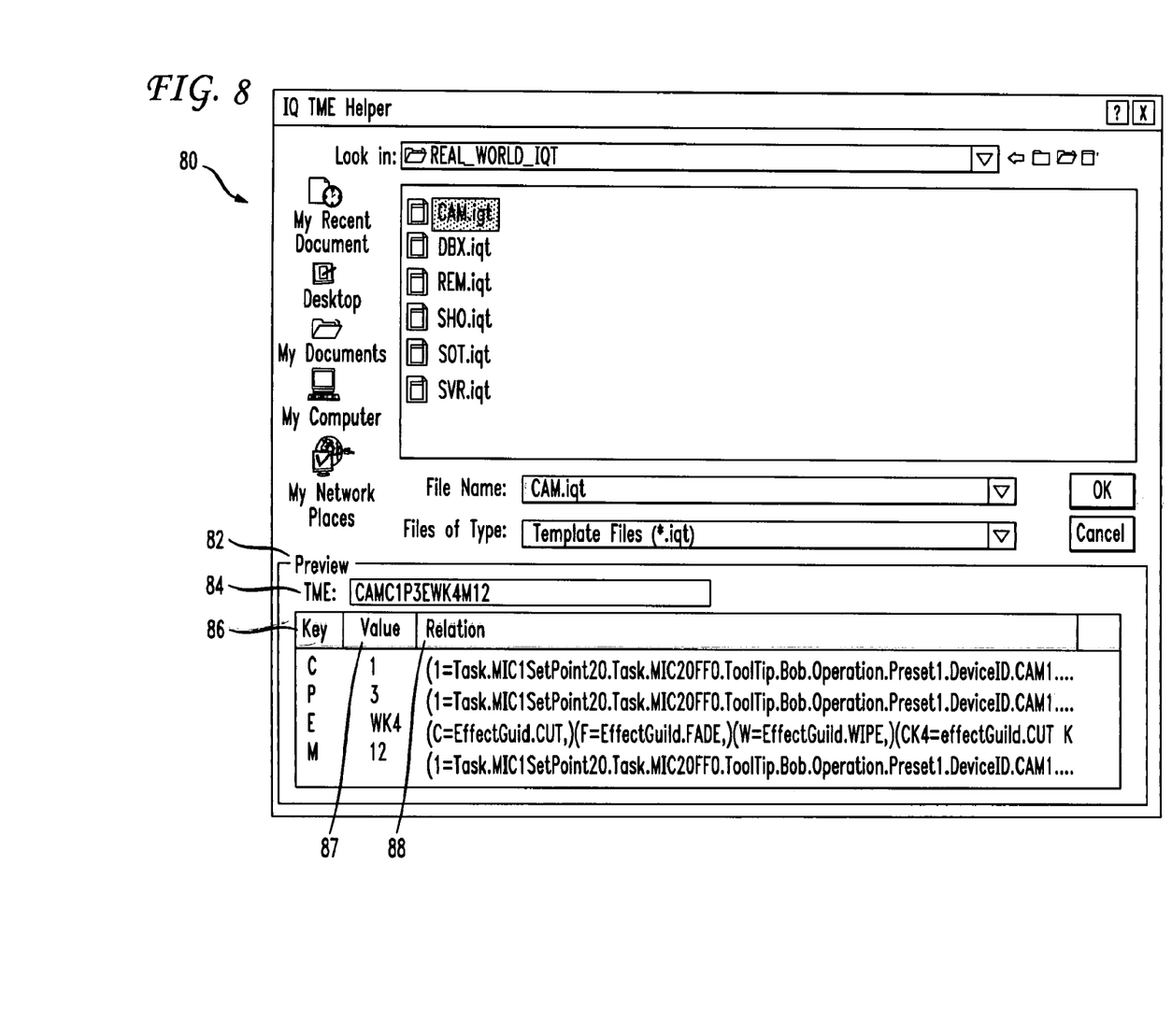
FIG. 8 depicts an example of a TME Helper interface, according to an implementation of the present principles.

FIG. 8 shows an example of the IQ TME Helper 80 according to an exemplary implementation. The IQ TME Helper 80 is used to find and select a TME/IQT to assign to a line of the IQ Markup Application. The upper portion of the IQ TME Helper is a standard Microsoft WINDOWS EXPLORER window consisting of:

Look In (selects the directory to look in);
File List (list of TME/IQT files);
File Name (Name of the selected file);
Files of type: (filters the File List for TME/IQT files); and
OK (Assigns the TME/IQT to the IQ Markup Application).

The lower portion of the IQ TME Helper consists of: a Preview area 82; a TME area 84 that shows the base name of the TME, plus the parameters and default values for each parameter. Within the preview area 82, other displayed fields include a Key field 86 where a list of the parameter names or key is provided, a Value field 87 which provides a list of the value of each parameter (note, upon clicking the value of a parameter via computer mouse or the like, a drop down list is opened with a list of values for the selected parameter), and a Relation field 88 that shows the fields and the values that are associated with the selected value.

Figure 9:
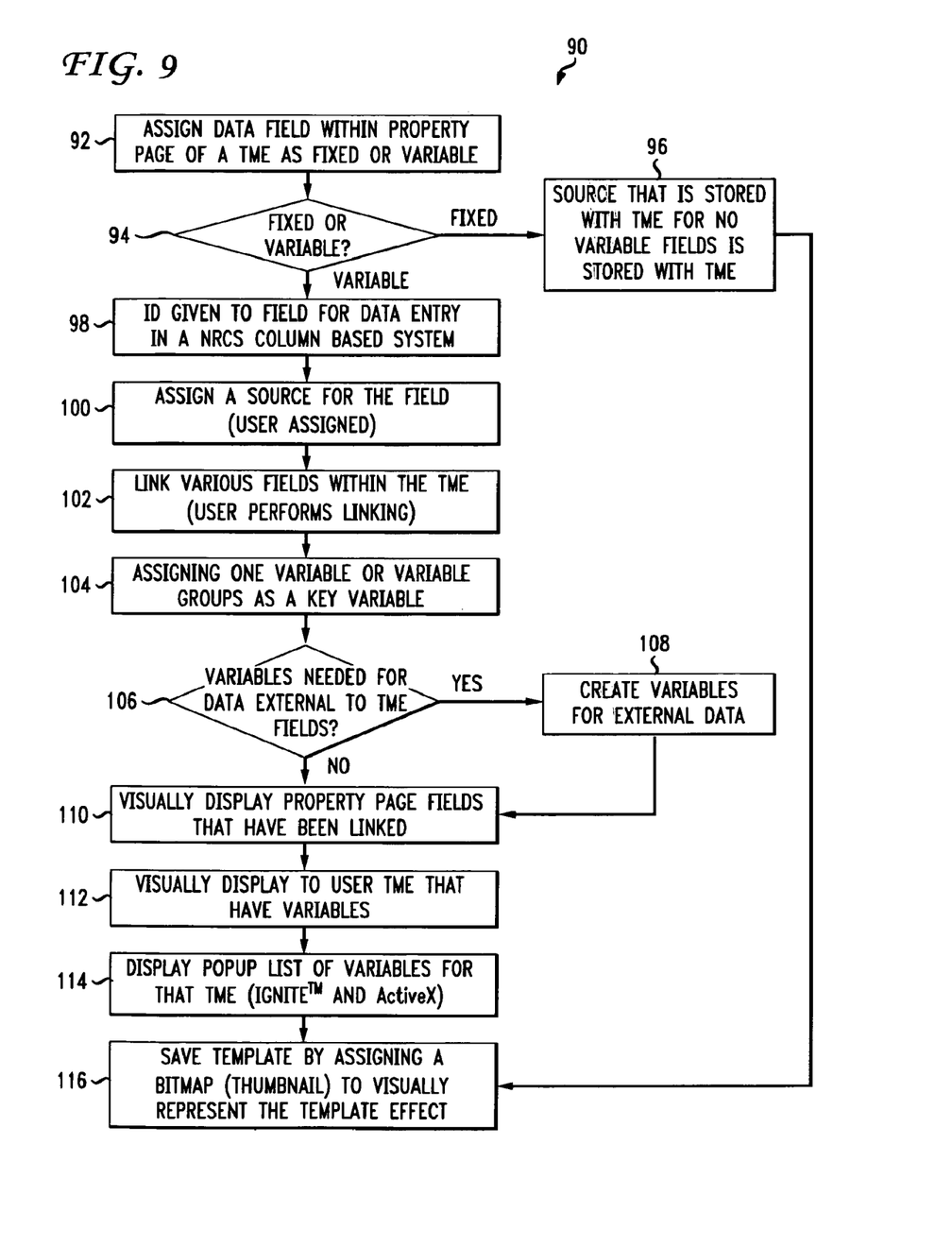
FIG. 9 depicts a flow chart illustrating the steps of a method for creating the transition m event template according to an implementation of the present principles.

FIG. 9 shows a flow chart of an exemplary implementation of a he method 90 for creating a new type of TME (i.e., the IQ Template of the present principles) which, as explained above, provides flexibility to adapt future changes in production system (e.g., newsroom) equipment and talent. Initially, each data field within a property page of a TME is assigned (92) as fixed or variable. By default, if a field within a property page is not assigned as variable (94), then it is fixed within the TME. Those of skill in the art will appreciate that "fixed" does not mean the TME cannot be edited, but that the source that is stored with the TME, for no variable fields, is stored with the TME.

When a field is assigned as variable, the field is given an identification (ID) for data entry in an NRCS column-based system (98). Here, the user would enter the TME base ID, and the Field ID with the Field value. For example if the user has created a VO TME (that has no field linking) and has four variable fields (e.g., "VP"—video preview bus & "Full"—audio preset event & "Under"—audio preset event & "MC"—machine control), the user would enter into the NRCS TME column "VO-VPVR2-FullMic1-UnderVR2-MCVR2" at this step 98.

A "VO" TME is a TME that is designed to roll a clip, transition the video to air, and bring an audio source on (usually an anchor microphone) so that the anchor can read over the video. Those of skill in the art will recognize that "VO" is an acronym for Voice Over—meaning a live source will read over the video clip, and "NAT" stands for Natural Sound—meaning that a live source will read over a clip that has natural sound under.

Within the same TME, some fields will be fixed (with assigned sources or not), and some fields get assigned as being variable, thus requiring a default source. When a field gets assigned as being variable, the user must also assign a source (100) for the field. That way, if a TME is created with variable fields, the TME can be recalled as the base without any field data being added. For example if the user created the above VO TME and, as required, assigned sources for the four variable fields (e.g., "VP"—VR1 & "Full"—Mic1 & "Under"—VR1 & "MC"—VR1), then when the TME is recalled it will have the default sources for each variable.

In addition to the above, when the data field is assigned as being variable, the present principles provide the user with a means to link various fields within the TME (102). For example, in the above VO TME scenario, there are three different property pages that have fields that need to be linked. The Video property page (Preview Bus-Field) is linked to the Audio property page (e.g., VR (virtual recorder) "Full" audio preset event), the VR Machine Control (Load), and the VR Machine Control (Play). The user could assign the Video (Preview Bus-Field) as the variable and link the audio event, Machine Control fields. In the NRCS TME column, the user would enter "VO-VPVR2". When the TME is imported by the automated television production system, the linked fields would be updated to correspond with the VR2 selection.

Once linked (102), one variable or a group of variables ("Variable Groups") must be assigned as the key variable (104). By assigning a key variable, other variables linked to this field will change based on source mapping assignments, when the key variable source is changed. Variable fields can be linked within the same property page and/or to other property page fields. Variable fields can be grouped together and the group linked to other property page fields. For example for a camera TME, the Camera field would be "Grouped" with the Preset field. The grouped fields would be linked to the video preview bus field and the audio event, for example, a "Full-MIC" has the capability to create audio actions that can be recalled from a TME/IQT. The naming of these actions is user defined, so the name can be anything. In this case the name "Full MIC" describes the action of taking a microphone source to the full position. "Full-MIC" is just an example of what a user might call this audio action. The combination of selections of the Camera & Preset would call out independent source mapping.

A TME can contain one or more variables that are linked to other fields and the field's linkage should be unique to each variable. For example a Video (Preview Bus-field) variable that is linked to an audio "Full" preset event for one audio source, a second Video (Key1 Fill Bus-field) can be linked to an audio "Full" preset event, but not to the same audio event as the first linked variable. Sometimes variables can need to be created for data that are external to TME fields. This is determined at step (106). For example, one might want to extract data from the rundown (Shot-Type, Anchor) and link this data to TME field data. The shot type, and anchor assignment can be mapped to a camera, preset, video input, or audio event. Both during and after the linking and assigning of key variables, the Property page fields that have been linked are visually displayed (110). As will be appreciated by those of ordinary skill in the art, the sources must be assigned to other linked sources. For example video source VR1 must be linked to audio source VR1, and to machine control device VR1. If a variable is linked to other fields, then only sources that are applicable for that field and have been mapped to sources for the corresponding linked fields will be selectable. If a variable is linked to other fields, but no source mapping has been assigned, then sources that are applicable for the variable field will be displayed, but not selectable. The item needs to visually indicate missing data.

Within the same TME one might have a variable that is linked to other fields and a variable that is independent. For example if the user created the above VO TME, the Video property page (Preview Bus-Field) is linked to the Audio property page (VR) (virtual recorder) "Full" audio preset event), the VR Machine Control (Load), and the VR Machine Control (Play). A second variable is created for the audio "Full" event. The user would enter into NRCS TME column VO-VPVR2-FullMic2. At this stage, the TMEs that have variables are visually displayed (112). For both the Timeline & Rundown List and ActiveX found in the IGNITE® automated television production system, a pop-up list of variables for that TME is also displayed (114). Once completed, the template is saved (116). When saved, the template is assigned a bitmap (thumbnail) to visually represent the Template effect.

It is to be understood that the present principles can be implemented in various forms of hardware, software, firmware, special purpose processors, or a combination thereof. Preferably, the present principles can be implemented as a combination of hardware and software. Moreover, the software is preferably implemented as an application program tangibly embodied on a program storage device. The application program can be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein can either be part of the microinstruction code or part of the application program (or a combination thereof) that is executed via the operating system. In addition, various other peripheral devices can be connected to the computer platform such as an additional data storage device and a printing device.

It is to be further understood that, because some of the constituent system components and method steps depicted in the accompanying Figures are preferably implemented in software, the actual connections between the system components (or the process steps) can differ depending upon the manner in which the present principles is programmed. Given the teachings herein, one of ordinary skill in the related art will be able to contemplate these and similar implementations or configurations of the present principles. While there have been shown, described and pointed out fundamental novel features of the present principles, it will be understood that various omissions, substitutions and changes in the form and details of the methods described and devices illustrated, and in their operation, can be made by those skilled in the art without departing from the scope of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles can be incorporated in any other disclosed, described or suggested form or implementation as a general matter of design choice. It is the intention, therefore, to be limited only as indicated by the scope of the claims appended hereto.

What is claimed:

1. A television production system for automatically controlling device parameters during television production, the television production system comprising:
   a memory; and
   a processor configured to implement instructions stored on the memory so as to provide:
   a template generator configured to create at least one macro event template that includes a plurality of property fields that control respective device parameters of at least one production device used during a television production, wherein at least first and second property fields are variable parameters that are configured to dynamically adjust the respective device parameters during the television production;
a parameter linking module configured to link at least one first variable parameter associated with the first property field with at least one second variable parameter associated with the second property field;
a rundown markup interface generator configured to generate a rundown markup interface by populating at least one of an event timeline and a playlist with newsroom computer system (NRCS) data for the television production and including at least one macro event generated from the at least one macro event template;
an automated television production system configured to prevent conflicts of the device parameters controlled by the first and second property fields by automatically modifying the at least one second variable parameter associated with the second property field in response to a change of the at least one first variable parameter, such that the device parameters controlled by the first and second property fields are set on the fly during the television production;
wherein a single macro event template includes the first property field linked to the second property field;
wherein the first property field is configured to dynamically adjust a first device parameter and the second property field is configured to dynamically adjust a second device parameter that is different than the first device parameter;
wherein the automated television production system is configured to prevent conflicts of the device parameters by automatically modifying the at least one second variable parameter in the single macro event template in response to the change of the at least one first variable parameter in the single macro event template, such that the device parameters controlled by the first and second property fields of the single macro event template are set on the fly during the television production.

2. The television production system according to claim 1, wherein the rundown markup interface generator is further configured to:
display the first and second property fields in the rundown markup interface;
display an operator selectable pop-up list of the variable parameters for at least the first property field upon an operator selecting the first property field; and
dynamically change the at least one first variable parameter in response to a user modification of the at least one first variable parameter by the displayed pop-up list.

3. The television production system according to claim 1, wherein the first property field is a video property field and the second property field is an audio property field,
wherein the parameter linking module is further configured to link the video property field to the audio property field to prevent conflicts between a video source and an audio source of the at least one production device during the television production, and
wherein the automated television production system automatically and on the fly modifies the linked audio property field during the television production to set the audio source for the at least one production device to capture audio data to prevent conflicts between the video source and the audio source when capturing video and audio data during the television production.

4. The television production system according to claim 1,
wherein the first and second property fields are first and second video property fields corresponding to a live video source and a recorded video source, respectively, and
wherein the automated television production system automatically and on the fly modifies the linked second video property field during the television production to prevent conflicts between the live video source and the recorded video source during the television production.

5. The television production system according to claim 1, wherein the generated rundown markup interface includes the NRCS data having a story running order with a plurality of stories and visually associates the macro event template with a respective story of the plurality of stories.

6. The television production system according to claim 1, wherein each of the template generator, the parameter linking module, the rundown markup interface generator, and the automated television production system are configured on a computer platform that includes the processor, the memory and an operating system configured to implement the instructions stored on the memory of the computer platform.

7. A media production system for automatically controlling device parameters during a media production, the media production system comprising:
a memory; and
a processor configured to implement instructions stored on the memory so as to provide:
a rundown markup interface generator configured to generate a rundown markup interface by populating at least one of an event timeline and a playlist with newsroom computer system (NRCS) data during creation of a media production and including a macro event generated from a macro event template that includes a first property field linked to a second property field, wherein the first property field is configured to dynamically adjust a first device parameter of at least one media production device and the second property field is configured to dynamically adjust a second device parameter of the at least one media production device that is different than the first device parameter; and
an automated media production system configured to on the fly prevent a conflict of the first device parameter of the at least one media production device by automatically modifying a first variable in the macro template that is associated with the first device parameter in response to a change of a second variable in the macro template associated with the second device parameter of the at least one media production device that is different than the first device parameter, such that the first device parameter controlled by the first variable is set on the fly to prevent a conflict between respective media sources of the respective first and second device parameters from occurring during creation of the media production.

8. The media production system according to claim 7, further comprising a template generator configured to create the macro event template that includes a plurality of property fields including the first and second property fields that control the first and second device parameters of the at least one production device used during the media production, wherein the first and second property fields are variable parameters that are configured to dynamically adjust the first and second device parameters during the media production.

9. The media production system according to claim 8, further comprising a parameter linking module configured to link at least one first variable parameter associated with the first property field with at least one second variable parameter associated with the second property field.

10. The media production system according to claim 9, wherein the rundown markup interface generator is further configured to:
   display the first and second property fields in the rundown markup interface;
   display an operator selectable pop-up list of the at least one first variable parameter for at least the first property field upon an operator selecting the first property field; and
   dynamically change the at least one first variable parameter in response to a user modification of the at least one first variable parameter by the displayed pop-up list.

11. The media production system according to claim 9,
   wherein the first property field is a video property field and the second property field is an audio property field,
   wherein the parameter linking module is further configured to link the video property field to the audio property field to prevent conflicts between a video source and an audio source of the at least one production device during the media production, and
   wherein the automated media production system automatically and on the fly modifies the linked audio property field during the media production to set the audio source for the at least one production device to capture audio data to prevent conflicts between the video source and the audio source when capturing video and audio data during the media production.

12. The media production system according to claim 8,
   wherein the first and second property fields are first and second video property fields corresponding to a live video source and a recorded video source, respectively, and
   wherein the automated media production system automatically and on the fly modifies the linked second video property field during the media production to prevent conflicts between the live video source and the recorded video source during the media production.

13. The media production system according to claim 8, wherein the generated rundown markup interface includes the NRCS data having a story running order with a plurality of stories and visually associates the macro event template with a respective story of the plurality of stories.

14. The media production system according to claim 8, wherein the macro template is configured to control the first device parameter and the second device parameter.

15. The media production system according to claim 14, wherein the automated media production system is configured to prevent conflicts between the device parameters by automatically modifying the first variable in response to the change of the second variable, such that the device parameters controlled by the macro event template are set on the fly during the media production.

16. The media production system according to claim 7, wherein each of the rundown markup interface generator and the automated media production system are configured on a computer platform that includes the processor, the memory and an operating system configured to implement the instructions stored on the memory of the computer platform.

17. A media production system for automatically controlling device parameters during a media production, the media production system comprising:
   a rundown markup interface generator configured to generate a rundown markup interface by populating at least one of an event timeline and a playlist during creation of a media production and including a macro event generated from a macro event template; and
   an automated media production system configured to on the fly prevent a conflict between a plurality of device parameters of at least one media production device by automatically modifying at least one first variable in the macro template that is associated with a first device parameter of the plurality of device parameters in response to a change of at least one second variable in the macro event that is associated with a second device parameter;
   wherein the macro event template includes a first property field having the at least one first variable that is configured to dynamically adjust the first device parameter and a second property field having the at least one second variable that is configured to dynamically adjust the second device parameter that is different than the first device parameter;
   wherein the first property field is linked to the second property field, such that the automated media production system is configured to control the first and second device parameters based on the first and second property fields of the macro event template, respectively, that are set on the fly during the media production; and
   wherein the rundown markup interface generator includes a processor configured to execute instructions stored in memory to generate the rundown markup interface, and the automated media production system includes a processor configured to execute instructions stored in memory to prevent the conflict between the plurality of device parameters.

18. The media production system according to claim 17, wherein the automated media production system modifies the at least one first variable to control the first device parameter to prevent a conflict between respective media sources of the respective first and second device parameters from occurring during creation of the media production.

19. The media production system according to claim 17, wherein the rundown markup interface generator is further configured to generate the rundown markup interface by populating the at least one of the event timeline and the playlist with newsroom computer system (NRCS) data during creation of the media production.

20. The media production system according to claim 19, wherein the generated rundown markup interface includes the NRCS data having a story running order with a plurality of stories and visually associates the macro event template with a respective story of the plurality of stories.

21. The media production system according to claim 17, further comprising a template generator configured to create the macro event template that includes a plurality of property fields including the first and second property fields that control the first and second device parameters of the at least one production device used during the media production, wherein the first and second property fields are variable parameters that are configured to dynamically adjust the first and second device parameters during the media production.

22. The media production system according to claim 21, further comprising a parameter linking module configured to link at least one first variable parameter associated with the first property field with at least one second variable parameter associated with the second property field.

23. The media production system according to claim 22, wherein the first property field is a video property field and the second property field is an audio property field, wherein the parameter linking module is further configured to link the video property field to the audio property field to prevent conflicts between a video source and an audio source of the at least one production device during the media production, and wherein the automated media production system automatically and on the fly modifies the linked audio property field during the media production to set the audio source for the at least one production device to capture audio data to prevent conflicts between the video source and the audio source when capturing video and audio data during the media production.

24. The media production system according to claim 22, wherein the first and second property fields are first and second video property fields corresponding to a live video source and a recorded video source, respectively, and wherein the automated media production system automatically and on the fly modifies the linked second video property field during the media production to prevent conflicts between the live video source and the recorded video source during the media production.

25. The media production system according to claim 17, wherein the automated media production system is configured to prevent conflicts between the plurality of device parameters by automatically modifying the at least one first variable in response to the change of the at least one second variable, such that the device parameters controlled by the first and second property fields of the macro event template are set on the fly during the media production.

26. the media production system according to claim 17, wherein each of the rundown markup interface generator and the automated media production system are configured on a computer platform that includes the processor, the memory and an operating system configured to execute the instructions stored in the memory of the computer platform.

27. A media production system for automatically controlling device parameters during a media production, the media production system comprising:

a template generator configured to generate a macro event template that includes a first property field configured to dynamically adjust a first device parameter of at least one media production device and a second property field configured to dynamically adjust a second device parameter of the at least one media production device that is different than the first device parameter, wherein the first property field is linked to the second property field;

an automated media production device controller configured to on the fly prevent a conflict between the first and second device parameters by automatically modifying a first variable in the macro template that is associated with the first property field in response to a change of a second variable in the macro event that is associated with the second property field, such that the first and second device parameters controlled by the first and second property fields of the macro event template are set on the fly during a television production; and wherein the template generator includes a processor configured to execute instructions stored in memory to generate the macro event template, and the automated media production device controller includes a processor configured to execute instructions stored in memory to prevent the conflict between the first and second device parameters.

28. The media production system according to claim 27, wherein the automated media production device controller is further configured to modify the first variable to control the first device parameter to prevent a conflict between respective media sources of the respective first and second device parameters from occurring during creation of the media production.

29. The media production system according to claim 27, further comprising a rundown markup interface generator configured to generate a rundown markup interface by populating at least one of an event timeline and a playlist during creation of a media production for the television production, with the generated rundown markup interface including a macro event generated from the macro event template.

30. The media production system according to claim 29, wherein the rundown markup interface generator is further configured to generate the rundown markup interface by populating the at least one of the event timeline and the playlist with newsroom computer system (NRCS) data during creation of the media production.

31. The media production system according to claim 30, further comprising a parameter linking module configured to link the first variable associated with the first property field with the second variable associated with the second property field.

32. The media production system according to claim 31, wherein the first property field is a video property field and the second property field is an audio property field, wherein the parameter linking module is further configured to link the video property field to the audio property field to prevent conflicts between a video source and an audio source of the at least one production device during the media production, and wherein the automated media production device controller is configured to automatically and on the fly modify the linked audio property field during the media production to set the audio source for the at least one production device to capture audio data to prevent conflicts between the video source and the audio source when capturing video and audio data during the media production.

33. The media production system according to claim 31, wherein the first and second property fields are first and second video property fields corresponding to a live video source and a recorded video source, respectively, and wherein the automated media production device controller is configured to automatically and on the fly modify the linked second video property field during the media production to prevent conflicts between the live video source and the recorded video source during the media production.

34. The media production system according to claim 30, wherein the generated rundown markup interface includes the NRCS data having a story running order with a plurality of stories and visually associates the macro event template with a respective story of the plurality of stories.

35. The media production system according to claim 27, wherein each of the template generator and the automated media production device controller are configured on a computer platform that includes the processor, the memory and an operating system configured to execute the instructions stored on the memory of the computer platform.

\* \* \* \* \*